US011526916B2

(12) United States Patent
Ziskind et al.

(10) Patent No.: US 11,526,916 B2
(45) Date of Patent: Dec. 13, 2022

(54) INTELLIGENT PREDICTION OF QUEUE WAIT TIMES

(71) Applicant: Blazer and Flip Flops, Inc., San Diego, CA (US)

(72) Inventors: Benjamin Harry Ziskind, San Diego, CA (US); Joshua David Bass, Carlsbad, CA (US); Scott Sebastian Sahadi, Solana Beach, CA (US); Benjamin Keeling Mathews, Orlando, FL (US)

(73) Assignee: Blazer and Flip Flops, Inc., San Diego, CA (US)

( * ) Notice: Subject to any disclaimer, the term of this patent is extended or adjusted under 35 U.S.C. 154(b) by 584 days.

(21) Appl. No.: 15/141,780

(22) Filed: Apr. 28, 2016

(65) Prior Publication Data

US 2016/0321548 A1   Nov. 3, 2016

Related U.S. Application Data

(60) Provisional application No. 62/153,686, filed on Apr. 28, 2015.

(51) Int. Cl.
*G06Q 10/02* (2012.01)
*G06Q 30/02* (2012.01)
(Continued)

(52) U.S. Cl.
CPC ......... *G06Q 30/0281* (2013.01); *G06N 7/005* (2013.01); *G06N 20/00* (2019.01)

(58) Field of Classification Search
None
See application file for complete search history.

(56) References Cited

U.S. PATENT DOCUMENTS 4,873,513 A   10/1989   Soults et al.
5,978,744 A   11/1999   McBride
(Continued)

FOREIGN PATENT DOCUMENTS

EP   1 288 627    3/2003
EP   2 650 692    10/2013
(Continued)

OTHER PUBLICATIONS

Journal of Computing and Info Tech-CIT 7, "Evolving Efficient Theme Parks" p. 79-80 (Year: 1999).*
(Continued)

*Primary Examiner* — Tonya Joseph
(74) *Attorney, Agent, or Firm* — Banner & Witcoff, Ltd.

(57) ABSTRACT

An estimate is provided for how long a guest will have to wait to enter a ride, restaurant, restroom, or other point of interest at a venue. Wait times are computed using one or more algorithms (e.g., Bayesian) that can combine direct measurements around the point of interest, historical measurements around the point of interest, and measurements taken from other systems not directly connected to the point of interest. Supporting systems will vary by venue and may include entry ticketing systems, network traffic, point of sale registers, event schedules, and proximity detectors in other parts of the venue. By comparing probabilities generated from this disparate data, current and future wait times can be estimated and provided to front-end devices corresponding to guests or staff.

22 Claims, 6 Drawing Sheets

(51) Int. Cl.
 *G06N 7/00* (2006.01)
 *G06N 20/00* (2019.01)

(56) References Cited

U.S. PATENT DOCUMENTS

| | | | |
|---|---|---|---|
| 6,142,368 A | 11/2000 | Mullins et al. | |
| 6,223,559 B1 | 5/2001 | Coleman | |
| 6,320,496 B1 | 11/2001 | Sokoler et al. | |
| 6,352,205 B1 | 3/2002 | Mullins et al. | |
| 6,369,840 B1 | 4/2002 | Barnett et al. | |
| 6,414,635 B1 | 7/2002 | Stewart et al. | |
| 6,474,557 B2 | 11/2002 | Mullins et al. | |
| 6,493,630 B2 | 12/2002 | Ruiz et al. | |
| 6,587,787 B1 | 7/2003 | Yokota | |
| 6,663,006 B2 | 12/2003 | Mullins et al. | |
| 6,687,608 B2 | 2/2004 | Sugimoto et al. | |
| 6,997,380 B2 | 2/2006 | Safael et al. | |
| 7,222,080 B2 | 5/2007 | Hale et al. | |
| 7,558,678 B2 | 7/2009 | Jones | |
| 7,802,724 B1 | 9/2010 | Nohr | |
| 7,992,773 B1 | 8/2011 | Rothschild | |
| 8,368,695 B2 | 2/2013 | Howell et al. | |
| 8,424,752 B2 | 4/2013 | Rothschild | |
| 8,427,510 B1 | 4/2013 | Towfiq et al. | |
| 8,433,342 B1 | 4/2013 | Boyle et al. | |
| 8,538,389 B1 | 9/2013 | Evans et al. | |
| 8,625,796 B1 | 1/2014 | Ben Ayed | |
| 8,651,369 B2 | 2/2014 | Rothschild | |
| 8,866,673 B2 | 10/2014 | Mendelson | |
| 8,936,190 B2 | 1/2015 | Rothschild | |
| 8,963,775 B2 | 2/2015 | Faragher | |
| 9,264,849 B1 | 2/2016 | Kahn et al. | |
| 9,448,085 B2 | 9/2016 | Bass | |
| 9,488,085 B2 | 9/2016 | Bass | |
| 9,485,322 B2 | 11/2016 | Krishnaswamy et al. | |
| 9,491,584 B1 | 11/2016 | Mendelson | |
| 9,674,684 B1 | 6/2017 | Mendelson | |
| 9,741,022 B2 | 8/2017 | Ziskind | |
| 9,813,855 B2 | 11/2017 | Sahadi | |
| 9,813,862 B2 | 11/2017 | Liu et al. | |
| 9,829,339 B2 | 11/2017 | Bass | |
| 9,906,909 B2 | 2/2018 | Sahadi | |
| 9,909,896 B2 | 3/2018 | Bass | |
| 10,028,091 B2 | 7/2018 | Sahadi | |
| 10,129,728 B2 | 11/2018 | Sahadi | |
| 10,149,103 B2 | 12/2018 | Sahadi | |
| 10,198,717 B2 | 2/2019 | Ziskind | |
| 10,210,542 B2 | 2/2019 | Bass | |
| 10,299,070 B2 | 5/2019 | Sahadi | |
| 11,127,054 B1 * | 9/2021 | Sulejmani | H04W 4/029 |
| 2002/0007292 A1 * | 1/2002 | Paxton | G06Q 10/02 705/6 |
| 2002/0029226 A1 | 3/2002 | Li et al. | |
| 2002/0055863 A1 | 5/2002 | Behaylo | |
| 2002/0194246 A1 | 12/2002 | Moskowitz et al. | |
| 2003/0007464 A1 | 1/2003 | Balani | |
| 2004/0093265 A1 * | 5/2004 | Ramchandani | G06Q 30/0235 705/14.25 |
| 2004/0224703 A1 | 11/2004 | Takaki et al. | |
| 2005/0114014 A1 | 5/2005 | Isaac | |
| 2006/0074550 A1 | 4/2006 | Freer et al. | |
| 2006/0087474 A1 | 4/2006 | Do et al. | |
| 2006/0106850 A1 | 5/2006 | Morgan et al. | |
| 2007/0032269 A1 | 2/2007 | Shostak | |
| 2007/0118415 A1 | 5/2007 | Chen et al. | |
| 2007/0174115 A1 | 7/2007 | Chieu et al. | |
| 2007/0197247 A1 | 8/2007 | Inselberg | |
| 2007/0225904 A1 | 9/2007 | Patanlone et al. | |
| 2007/0239348 A1 | 10/2007 | Cheung | |
| 2007/0270161 A1 | 11/2007 | Hampel et al. | |
| 2007/0270166 A1 | 11/2007 | Hampel et al. | |
| 2008/0059889 A1 | 3/2008 | Parker et al. | |
| 2008/0067244 A1 | 3/2008 | Marks | |
| 2008/0183582 A1 | 7/2008 | Major | |
| 2008/0186164 A1 | 8/2008 | Emigh et al. | |
| 2008/0290182 A1 | 11/2008 | Bell et al. | |
| 2008/0306826 A1 | 12/2008 | Kramer et al. | |
| 2008/0312946 A1 | 12/2008 | Valentine et al. | |
| 2009/0017798 A1 | 1/2009 | Pop | |
| 2009/0027418 A1 | 1/2009 | Maru et al. | |
| 2009/0055208 A1 * | 2/2009 | Kaiser | G06Q 10/02 705/5 |
| 2009/0089131 A1 | 4/2009 | Moukas et al. | |
| 2009/0222388 A1 * | 9/2009 | Hua | G06V 20/53 382/103 |
| 2009/0265428 A1 | 10/2009 | Light et al. | |
| 2009/0319306 A1 | 12/2009 | Chanick | |
| 2009/0319616 A1 | 12/2009 | Lewis et al. | |
| 2010/0037141 A1 | 2/2010 | Carter et al. | |
| 2010/0042320 A1 | 2/2010 | Salmre et al. | |
| 2010/0063854 A1 | 3/2010 | Purvis et al. | |
| 2010/0077036 A1 | 3/2010 | DeLuca et al. | |
| 2010/0161432 A1 | 6/2010 | Kumanov et al. | |
| 2010/0194784 A1 | 8/2010 | Hoff et al. | |
| 2011/0054976 A1 | 3/2011 | Adler et al. | |
| 2011/0078026 A1 | 3/2011 | Durham | |
| 2011/0090123 A1 | 4/2011 | Sridhara et al. | |
| 2011/0130955 A1 | 6/2011 | Pu et al. | |
| 2011/0136507 A1 | 6/2011 | Hauser et al. | |
| 2011/0173545 A1 | 7/2011 | Meola | |
| 2011/0221745 A1 | 9/2011 | Golman et al. | |
| 2011/0231235 A1 | 9/2011 | MacIlwaine et al. | |
| 2011/0246148 A1 | 10/2011 | Gupta et al. | |
| 2011/0267369 A1 | 11/2011 | Olsen et al. | |
| 2012/0024947 A1 | 2/2012 | Naelon | |
| 2012/0069131 A1 | 3/2012 | Abelow | |
| 2012/0081250 A1 | 4/2012 | Farrokhi et al. | |
| 2012/0096490 A1 | 4/2012 | Barnes | |
| 2012/0166960 A1 | 6/2012 | Salles | |
| 2012/0172055 A1 | 7/2012 | Edge | |
| 2012/0179764 A1 | 7/2012 | Erdal | |
| 2012/0182933 A1 | 7/2012 | Bandhakavi | |
| 2012/0191497 A1 * | 7/2012 | Patterson | G06Q 10/06311 705/7.13 |
| 2012/0197690 A1 | 8/2012 | Agulnek | |
| 2012/0197720 A1 | 8/2012 | Bezancon et al. | |
| 2012/0214515 A1 | 8/2012 | Davis et al. | |
| 2012/0239504 A1 | 9/2012 | Curlander et al. | |
| 2012/0270573 A1 | 10/2012 | Marti et al. | |
| 2012/0271691 A1 | 10/2012 | Hammad et al. | |
| 2012/0274642 A1 | 11/2012 | Ofek et al. | |
| 2012/0284117 A1 | 11/2012 | Karandikar | |
| 2013/0012235 A1 | 1/2013 | Burdo et al. | |
| 2013/0024203 A1 | 1/2013 | Flores et al. | |
| 2013/0024265 A1 | 1/2013 | Lotzof | |
| 2013/0030875 A1 | 1/2013 | Lee et al. | |
| 2013/0036455 A1 | 2/2013 | Bodi et al. | |
| 2013/0052990 A1 | 2/2013 | Zhang | |
| 2013/0059603 A1 | 3/2013 | Guenec et al. | |
| 2013/0073381 A1 | 3/2013 | Binkley | |
| 2013/0085834 A1 | 4/2013 | Witherspoon et al. | |
| 2013/0091452 A1 | 4/2013 | Sorden et al. | |
| 2013/0124234 A1 | 5/2013 | Nilsson et al. | |
| 2013/0132230 A1 | 5/2013 | Gibson et al. | |
| 2013/0137464 A1 | 5/2013 | Kramer et al. | |
| 2013/0157655 A1 | 6/2013 | Smith et al. | |
| 2013/0158867 A1 | 6/2013 | Sidhu et al. | |
| 2013/0173377 A1 | 7/2013 | Keller et al. | |
| 2013/0173393 A1 | 7/2013 | Calman et al. | |
| 2013/0191213 A1 | 7/2013 | Beck et al. | |
| 2013/0225282 A1 | 8/2013 | Williams et al. | |
| 2013/0231135 A1 | 9/2013 | Garskof | |
| 2013/0267260 A1 | 10/2013 | Chao et al. | |
| 2013/0279543 A1 | 10/2013 | Torimoto et al. | |
| 2013/0281084 A1 | 10/2013 | Batada et al. | |
| 2013/0317944 A1 | 11/2013 | Huang et al. | |
| 2013/0339073 A1 | 12/2013 | Dabbiere | |
| 2014/0025466 A1 | 1/2014 | Borton et al. | |
| 2014/0058766 A1 | 2/2014 | Yu et al. | |
| 2014/0067544 A1 | 3/2014 | Klish et al. | |
| 2014/0073363 A1 | 3/2014 | Tidd et al. | |
| 2014/0074593 A1 | 3/2014 | Chomsky et al. | |
| 2014/0082509 A1 | 3/2014 | Roumeliotis et al. | |
| 2014/0118113 A1 | 5/2014 | Kaushik et al. | |

(56) References Cited

U.S. PATENT DOCUMENTS

| | | |
|---|---|---|
| 2014/0122040 A1 | 5/2014 | Marti |
| 2014/0128103 A1 | 5/2014 | Joao et al. |
| 2014/0129266 A1 | 5/2014 | Perl et al. |
| 2014/0132772 A1 | 5/2014 | Billau et al. |
| 2014/0162693 A1 | 6/2014 | Wachter et al. |
| 2014/0164761 A1 | 6/2014 | Kufluk et al. |
| 2014/0188614 A1 | 7/2014 | Badenhop |
| 2014/0189802 A1 | 7/2014 | Montgomery |
| 2014/0207509 A1 | 7/2014 | Yu et al. |
| 2014/0228060 A1 | 8/2014 | Abhyanker |
| 2014/0237076 A1 | 8/2014 | Goldman et al. |
| 2014/0244332 A1 | 8/2014 | Mermelstein |
| 2014/0253383 A1 | 9/2014 | Rowitch |
| 2014/0256357 A1 | 9/2014 | Wang et al. |
| 2014/0257991 A1 | 9/2014 | Christensen et al. |
| 2014/0278054 A1 | 9/2014 | Tidd et al. |
| 2014/0292481 A1 | 10/2014 | Dumas et al. |
| 2014/0342760 A1 | 11/2014 | Moldavsky et al. |
| 2015/0028996 A1 | 1/2015 | Agrafioti et al. |
| 2015/0035644 A1 | 2/2015 | June et al. |
| 2015/0038171 A1 | 2/2015 | Uilecan et al. |
| 2015/0052460 A1 | 2/2015 | Mohammad Mirzaei et al. |
| 2015/0058133 A1 | 2/2015 | Roth et al. |
| 2015/0074558 A1 | 3/2015 | Haskins et al. |
| 2015/0080014 A1 | 3/2015 | Ben-Yosef et al. |
| 2015/0081348 A1 | 3/2015 | Avera et al. |
| 2015/0081532 A1 | 3/2015 | Lewis et al. |
| 2015/0088671 A1* | 3/2015 | Xiong ................ G06Q 30/016 705/15 |
| 2015/0100398 A1 | 4/2015 | Narayanaswami et al. |
| 2015/0112841 A1 | 4/2015 | Ivanovic et al. |
| 2015/0127445 A1 | 5/2015 | Jaffee |
| 2015/0154674 A1 | 6/2015 | Todasco |
| 2015/0176997 A1 | 6/2015 | Pursche et al. |
| 2015/0181384 A1 | 6/2015 | Mayor et al. |
| 2015/0222935 A1 | 8/2015 | King et al. |
| 2015/0229626 A1 | 8/2015 | Hauhn |
| 2015/0233715 A1 | 8/2015 | Xu et al. |
| 2015/0237473 A1 | 8/2015 | Koepke |
| 2015/0241238 A1 | 8/2015 | Bass |
| 2015/0242890 A1 | 8/2015 | Bass et al. |
| 2015/0244725 A1 | 8/2015 | Ziskind |
| 2015/0262086 A1 | 9/2015 | Mader et al. |
| 2015/0262216 A1 | 9/2015 | Aziz et al. |
| 2015/0294303 A1 | 10/2015 | Hanson et al. |
| 2015/0296347 A1 | 10/2015 | Roth |
| 2015/0334569 A1 | 11/2015 | Rangarajan et al. |
| 2015/0334676 A1 | 11/2015 | Hart et al. |
| 2016/0005003 A1 | 1/2016 | Norris et al. |
| 2016/0050526 A1 | 2/2016 | Liu et al. |
| 2016/0063537 A1 | 3/2016 | Kumar |
| 2016/0078370 A1 | 3/2016 | McEwen et al. |
| 2016/0105644 A1 | 4/2016 | Smith et al. |
| 2016/0127351 A1 | 5/2016 | Smith et al. |
| 2016/0150370 A1 | 5/2016 | Gillespie et al. |
| 2016/0242010 A1 | 8/2016 | Parulski et al. |
| 2016/0283082 A1 | 9/2016 | Roskind et al. |
| 2016/0286361 A1 | 9/2016 | Ciecko |
| 2016/0300192 A1 | 10/2016 | Zamer |
| 2016/0316324 A1 | 10/2016 | Sahadi |
| 2016/0323708 A1 | 11/2016 | Sahadi |
| 2017/0010119 A1 | 1/2017 | Bass |
| 2017/0011348 A1 | 1/2017 | Ziskind |
| 2017/0161720 A1 | 6/2017 | Xing et al. |
| 2017/0162006 A1 | 6/2017 | Sahadi |
| 2017/0169449 A1 | 6/2017 | Heaven et al. |
| 2017/0237820 A1 | 8/2017 | Scarborough et al. |
| 2017/0248438 A1 | 8/2017 | Bass |
| 2017/0372270 A1 | 12/2017 | Ziskind |
| 2018/0005194 A1 | 1/2018 | Dotan-Cohen et al. |
| 2018/0012195 A1 | 1/2018 | Nagaraj |
| 2018/0124559 A1 | 5/2018 | Sahadi |
| 2018/0192248 A1 | 7/2018 | Sahadi |
| 2019/0014438 A1 | 1/2019 | Sahadi |

FOREIGN PATENT DOCUMENTS

| | | |
|---|---|---|
| WO | WO 2011/115855 | 9/2011 |
| WO | WO 2011/159811 | 12/2011 |
| WO | WO 2013/163444 | 10/2013 |
| WO | WO 2015/017442 | 2/2015 |
| WO | WO 2015/130969 | 9/2015 |
| WO | WO 2015/130971 | 9/2015 |
| WO | WO 2016/172731 | 10/2016 |
| WO | WO 2016/176506 | 11/2016 |
| WO | WO 2016/179098 | 11/2016 |
| WO | WO 2017/100801 | 6/2017 |

OTHER PUBLICATIONS

Evolving Efficient Them Park Tours Testa et al. (Year: 1999).*
PCT Application No. PCT/US2016/067582, International Search Report and Written Opinion dated Mar. 17, 2017.
U.S. Appl. No. 14/633,015 Office Action dated Apr. 13, 2017.
U.S. Appl. No. 15/138,157 Office Action dated Mar. 9, 2017.
U.S. Appl. No. 15/144,359 Office Action dated Apr. 5, 2017.
Feng et al., Yue ; "Effective venue image retrieval using robust feature extraction and model constrained matching for mobile robot localization", Machine Vision and Applications, DOI 10.1007/s00138-011-0350-z, Oct. 28, 2010.
Krueger, Robert; Thom, Dennis; Ertl, Thomas; "Visual Analysis of Movement Behavior using Web Data for Context Enrichment" Institute for Visualization and Interactive Systems (VIS), Published in *Pacific Visualization Symposium (PacificVis), 2014 IEEE*, pp. 193-200.IEEE, 2014.
Sim, Robert; Dudek, Gregory; "Effective Exploration Strategies for the Construction of Visual Maps", Centre for Intelligent Machines, Published in: Intelligent Robots and Systems, 2003. (IROS 2003). Proceedings. 2003 IEEE/RSJ International Conference on (vol. 4) Date of Conference: Oct. 27-31, 2003.
PCT Application No. PCT/US2004/12667, International Search Report dated Oct. 29, 2004.
PCT Application No. PCT/US2015/017827, International Search Report and Written Opinion dated Jun. 11, 2015.
PCT Application No. PCT/US2015/017829, International Search Report and Written Opinion dated Jun. 8, 2015.
U.S. Appl. No. 14/632,872 Office Action dated Mar. 7, 2016.
U.S. Appl. No. 14/633,019 Office Action dated May 6, 2016.
PCT Application No. PCT/US2016/029260, International Search Report and Written Opinion dated Jul. 27, 2016.
PCT Application No. PCT/US2016/029880, International Search Report and Written Opinion dated Jul. 27, 2016.
PCT Application No. PCT/US2016/030424, International Search Report and Written Opinion dated Jul. 29, 2016.
U.S. Appl. No. 15/271,087 Office Action dated Jun. 7, 2017.
U.S. Appl. No. 15/597,609 Office Action dated Jul. 10, 2017.
U.S. Appl. No. 14/632,884 Office Action dated May 19, 2017.
U.S. Appl. No. 14/633,019 Final Office Action dated Nov. 10, 2016.
U.S. Appl. No. 14/633,015 Final Office Action dated Dec. 28, 2017.
U.S. Appl. No. 15/683,620 Office Action dated Feb. 22, 2018.
U.S. Appl. No. 15/383,710 Final Office Action dated Jan. 30, 2018.
U.S. Appl. No. 14/633,015 Office Action dated Jun. 25, 2018.
U.S. Appl. No. 15/683,620, Benjamin H. Ziskind, Parental Controls, filed Aug. 22, 2017.
U.S. Appl. No. 15/906,285, Scott S. Sahadi, Map Based Beacon Management, Not Yet Assigned.
European Patent Application 16789894.9 Extended European Search Report dated Oct. 17, 2018.
U.S. Appl. No. 14/632,884 Final Office Action dated Dec. 1, 2017.
U.S. Appl. No. 15/906,285 Office Action dated May 9, 2018.
European Patent Application 15755106.0 Examination Report dated Dec. 17, 2019.
European Patent Application 16787189.6 Extended European Search Report dated Oct. 26, 2018.
PCT Application No. PCT/US2015/017827, International Preliminary Report on Patentability dated Aug. 30, 2016.
PCT Application No. PCT/US2015/017829, International Preliminary Report on Patentability dated Aug. 30, 2016.

(56) References Cited

OTHER PUBLICATIONS

PCT Application No. PCT/US2016/029260, International Preliminary Report on Patentability dated Oct. 24, 2017.
PCT Application No. PCT/US2016/029880, International Preliminary Report on Patentability dated Oct. 31, 2017.
PCT Application No. PCT/US2016/030424, International Preliminary Report on Patentability dated Nov. 7, 2017.
PCT Application No. PCT/US2016/067582, International Preliminary Report on Patentability dated Jun. 12, 2018.
European Patent Application 15754659.9 Extended European Search Report dated Sep. 29, 2017.
U.S. Appl. No. 14/632,884 Office Action dated Apr. 2, 2018.
U.S. Appl. No. 15/805,014 Office Action dated Apr. 5, 2018.
European Patent Application 15754659.9 EP Examination Report dated May 2, 2019.
European Patent Application 16784110.5 Extended European Search Report dated Nov. 7, 2018.
U.S. Appl. No. 15/383,710 Office Action dated Aug. 16, 2017.
U.S. Appl. No. 14/633,015, Benjamin H. Ziskind, Venue Notifications, filed Feb. 26, 2015.
U.S. Appl. No. 15/138,157, Scott S. Sahadi, Targeted Venue Message Distribution, filed Apr. 25, 2016.
PCT/US16/29260, Targeted Venue Message Distribution, Apr. 25, 2016.
U.S. Appl. No. 15/144,359, Scott S. Sahadi, Map Based Beacon Management, filed May 2, 2016.
PCT/US16/30424, Map Based Beacon Management, May 2, 2016.
PCT/US16/29880, Intelligent Prediction of Queue Wait Times, Apr. 28, 2016.
U.S. Appl. No. 15/805,014, Scott S. Sahadi, Targeted Venue Message Distribution, filed Nov. 6, 2017.
U.S. Appl. No. 15/383,710, Scott S. Sahadi, Wearable Device, filed Dec. 19, 2016.
PCT/US16/67582, Wearable Device, Dec. 19, 2016.
U.S. Appl. No. 15/271,087, Joshua D. Bass, Live Branded Dynamic Mapping, Not Yet Assigned.
U.S. Appl. No. 15/597,609, Joshua D. Bass, Live Branded Dynamic Mapping, filed May 7, 2017.

\* cited by examiner

- Front-end device 405
- App Navigation 410
- Image of point of interest 415
- Name, summary, and wait time 420
- Buttons (ticket, travel) 425
- Height requirement information 430
- Estimated wait time graph 435
- Mini-map 440

INTELLIGENT PREDICTION OF QUEUE WAIT TIMES

CROSS-REFERENCE TO RELATED APPLICATIONS

The present application claims the priority benefit of U.S. provisional application No. 62/153,686 filed Apr. 28, 2015 and entitled "System and Method for Predicting Line Wait Times," which is hereby incorporated by reference.

BACKGROUND

1. Field of the Invention

The present invention generally concerns analytics pattern processing. More particularly, the present invention concerns predicting line wait times based on multiple sources of data.

2. Description of the Related Art

Entertainment and event venues such as theme parks, cruise ships, universities, arenas, concert venues, ski resorts, relaxation resorts, ice rinks, spas, skate parks, and stadiums typically have large numbers of visitors/guests. These venues typically have multiple "points of interest" that correspond to locations of attractions such as restaurants, cafeterias, concession stands, stores, libraries, theme park rides, theatre shows, movies, circus shows, animal shows, or costumes characters. Points of interest may also include locations of restrooms, water fountains, entrances, exits, or crossroads.

Due to the large numbers of guests in these various venues, those wishing to visit such points of interest will typically be required to stand in fairly long lines. The wait line for any given point of interest may have different numbers of guests on different days (e.g., weekends versus weekdays) and during different times of day (e.g., mornings versus afternoons). More guests in a line typically translates to a longer wait time unless guest throughput is increased by the entertainment venue. Means for increasing throughput might include operating additional cash registers or increasing overall guest capacity of a particular venue as might occur through making available an increased number of seats or moving furniture to increase floor space.

Some entertainment venues currently provide an estimated line wait time to guests. But this wait time is a rough estimate typically determined by venue staff periodically picking a single guest and tracking how long it takes that guest to traverse the line. Though somewhat helpful to new guests entering the line, line conditions may fluctuate during the wait time making the prediction inaccurate. This might occur with a rapid influx of new guests in a relatively short period of time. While staff may react by increasing guest throughput or guest capacity, such reaction is after-the-fact and occurs only once the problem is visibly identified.

Such manual wait time estimates are typically only provided for large "main" attractions due to the effort required. As a result, wait times for smaller attractions are often completely unknown to guests. Furthermore, there is no way to predict future wait times (i.e., what will the wait time be in one hour or next Tuesday or on a particular holiday) using manual methods such as these.

Thus, there is a need in the art for determining wait times for points of interest in a venue.

SUMMARY OF THE PRESENTLY CLAIMED INVENTION

A first claimed embodiment of the present invention involves a method for queue wait time estimation, and includes receiving mobile device location data associated with a plurality of guest mobile devices corresponding to a plurality of venue guests within a venue. The method also includes receiving event schedule data corresponding to schedules associated with a plurality of points of interest located within the venue. The method also includes generating an estimated wait time based at least on the received mobile device location data and the received event schedule data, the estimated wait time corresponding to a first point of interest of the plurality of points of interest. The method also includes transmitting a wait time dataset identifying the estimated wait time to a front-end device, thereby displaying the estimated wait time via the front-end device.

A second claimed embodiment of the present invention concerns a system for queue wait time estimation that includes a communication transceiver receiving mobile device location data and event schedule data. The mobile device location data is associated with a plurality of guest mobile devices corresponding to a plurality of venue guests within a venue. The event schedule data corresponds to schedules associated with a plurality of points of interest located within the venue. The system also includes a memory. The system also includes a processor coupled to the memory and to the communication transceiver. Execution of instructions stored in the memory by the processor performs system operations. The system operations include generating an estimated wait time based at least on the received mobile device location data and the received event schedule data, the estimated wait time corresponding to a first point of interest of the plurality of points of interest. The system operations also include triggering transmission of a wait time dataset to a front-end device via the communication transceiver, the wait time dataset identifying the estimated wait time, thereby displaying the estimated wait time via the front-end device A third-claimed embodiment of the present invention concerns a non-transitory computer-readable storage medium having embodied thereon a program executable by a processor to perform a method for queue wait time estimation. The executable method includes receiving mobile device location data associated with a plurality of guest mobile devices corresponding to a plurality of venue guests within a venue. The executable method also includes receiving event schedule data corresponding to schedules associated with a plurality of points of interest located within the venue. The executable method also includes generating an estimated wait time based at least on the received mobile device location data and the received event schedule data, the estimated wait time corresponding to a first point of interest of the plurality of points of interest. The executable method also includes transmitting a wait time dataset identifying the estimated wait time to a front-end device, thereby displaying the estimated wait time via the front-end device.

DETAILED DESCRIPTION

An estimate is provided for how long a guest will have to wait to enter a ride, restaurant, restroom, or other point of interest at a venue. Wait times are computed using one or more algorithms (e.g., Bayesian) that can combine direct measurements around the point of interest, historical measurements around the point of interest, and measurements taken from other systems not directly connected to the point of interest. Supporting systems will vary by venue and may include entry ticketing systems, network traffic, point of sale registers, event schedules, and proximity detectors in other parts of the venue. By comparing probabilities generated from this disparate data, current and future wait times can be estimated and provided to front-end devices corresponding to guests or staff.

Figure 1:
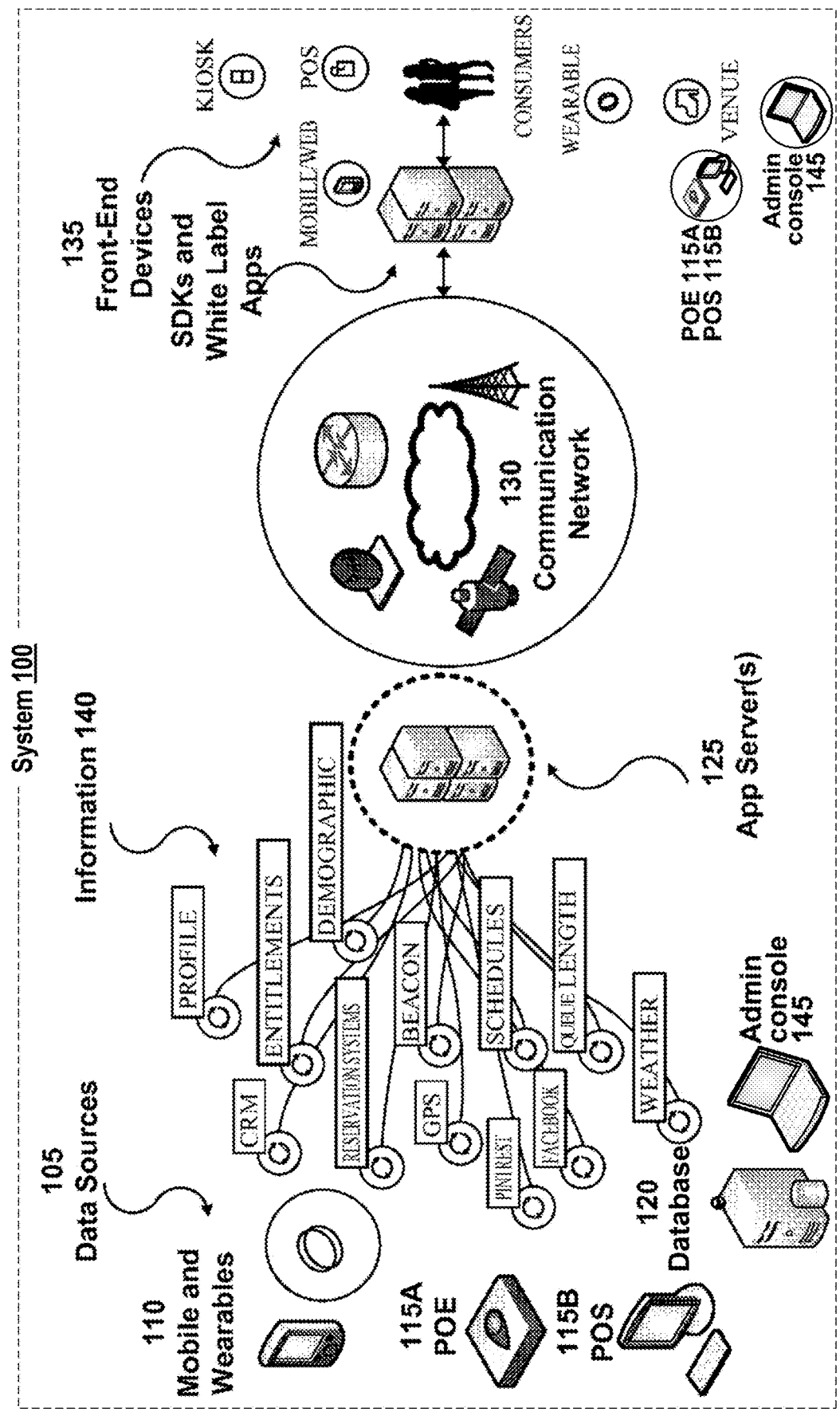
FIG. 1 is a block diagram of a wait time estimation ecosystem.

FIG. 1 is a block diagram of a wait time estimation ecosystem 100. The wait time estimation ecosystem 100 may be used within a venue with multiple points of interest. The venue may be an entertainment venue or an event venue, which may include a theme park, a cruise ship, a school, a university, an arena, a concert venue, a ski resort, a relaxation resort, an ice rink, a shopping mall, a spa, a skate park, or a stadium. The points of interest of the venue may identify locations associated with attractions such as restaurants, cafeterias, concession stands, stores, libraries, theme park rides, theatre shows, movies circus shows, animal shows, or costumed characters. Points of interest may also include locations associated with restrooms, water fountains, entrances, exits, or crossroads. An area such as an attraction or a restroom may be associated with multiple points of interest. For example, a given area may correspond to a number of entrances and exits or to multiple points of sale such as cashiers or card readers.

The wait time estimation ecosystem 100 illustrated in FIG. 1 centers around one or more application server(s) 125. These application server(s) 125 obtain information 140 from one or more data source(s) 105. The application server(s) 125 transmit data identifying current or future estimated wait times associated with particular points of interest in the venue (e.g., attractions, restrooms, crossroads) via the communication network 130. This wait time data is transmitted by the application server(s) 125 to one or more front-end device(s) 135. The application server(s) 125 and data source(s) 105 may be located within or outside the entertainment venue. The front-end devices 135 receiving the messages are generally located within the entertainment venue, but in some cases may be located outside of the same. For example, a mobile device may be associated with a guest who is about to enter the entertainment venue. Similarly, a device may be associated with a staff member who is working remotely or on the outside perimeter of the venue.

The estimated wait time data provided by the system of FIG. 1 may estimate how long a guest will currently or at some point in the future have to wait to enter a ride, restaurant, restroom, or other "attraction" or point of interest at a venue. Wait times may be computed based on the acquired information 140 using a wait time calculation algorithm that allows calculation of estimates based on various types of information. For example, a Bayesian algorithm may be used to combine direct measurements around the point of interest, historical measurements around the point of interest, or measurements taken from other support systems not directly connected to the point of interest. Using the collected data 140, it becomes possible to take a "snapshot in time" of the data sources and use them as inputs to predict current and future wait times for any point of interest. The data sources 105 that make up the aforementioned supporting systems or that otherwise provided information 140 used in wait time calculations may include mobile devices 110 (including wearable devices), point-of-entry (POE) or point-of-exit (POE) terminals/beacons 115A, point-of-service (POS) terminals 115B, or database(s) 120. Point of service terminals 115B may include cash registers, credit card readers, electronic payment receivers, or some combination thereof.

POE terminals/beacons 115A and POS terminals 115B can provide valuable information about traffic flow, and location data corresponding to mobile devices 110 that are interacting with the POE terminals/beacons 115A and/or POS terminals 115B even when the mobile devices 110 would not otherwise have signal reception. Database 120 may store historical data so that trends may be determined and used as part of the analysis (e.g., tracking how much traffic typically changes on weekends versus weekdays or at particular times of day). The mobile devices 110, either alone or in combination with these other data source(s) 105, may provide information 140 in the form of global positioning system (GPS) data or beacon proximity data.

The information 140 may also include social media data related to Facebook, Twitter, Instagram, Pinterest, Tumblr, or other social media accounts. Such social media data may include profile information, friend information, photos, message information, or some combination thereof. The information 140 may also include login information, guest settings, guest disability information, guest reservation status information, guest demographic information, entitlement information, customer relationship management (CRM) software information, weather information, queue length information, or some combination thereof.

The data sources 105 may also include information 140 from an administrator console 145 (e.g., which may in some cases be coupled to the database 120, or to a mobile device 110, or to a point of service terminal 115B, or to a point of entry/exit terminal 115A). The information 140 from the administrator console 145 may be generated via an administrator user interface allowing an administrator to manually enter information 140 to be collected by the application server(s) 125. For example, an administrator could manually provide information identifying that a particular attraction will be closed for routine maintenance starting during a predetermined time range. Such an administrator console 145 may be a computer system 600 as illustrated in FIG. 6, or at least may include at least a subset of the components illustrated within the computer system 600 of FIG. 6.

A mobile device 110 of a guest of the entertainment venue may be both a data source 105 that provides information 140 to the application server(s) 125 and a front-end device 135 that receives estimated wait time data transmitted by the application server(s) 125 over the communication network 130. Such a mobile device 110 may be a computer system 600 as illustrated in FIG. 6, or may include at least a subset of the components illustrated within the computer system 600 of FIG. 6.

The mobile device 110 may be a wearable device (also known as a "wearable"), meaning any type of mobile electronic device that can be worn on the body or attached to or embedded in clothes and accessories of an individual. Mobile devices 110 can execute an application (e.g., which may be embedded within an operating system, produced by a third party, or some combination thereof) that shares customer engagement information 140 with a venue's application server(s) 125, receives estimated wait time data, or some combination thereof. The customer engagement data information 140 collected by the application at each mobile device 110 and transmitted to the application server(s) 125 may include a current location, a prior location, a customer wait time in a particular area, a travel time from one area to another, a path taken from one area to another, or some combination thereof.

Processors and sensors associated with a mobile device 110 can gather, process, display, and transmit and receive information. In some cases, the mobile device 110 of a guest may in fact include multiple electronic devices, such as a wearable device wirelessly connected to a "smart" phone, wherein both the wearable device and the "smart" phone include sensors that help obtain information 140 that is then passed to the application server(s) 125, and wherein both the wearable device and the "smart" phone can received estimated wait time data as front-end devices 135.

The system 100 of FIG. 1 may be used with and communicate with any number of external front-end devices 135 by way of communications network 130. Communication network 130 may be or include an "intranet," e.g., a personal area network (PAN), a local area network (LAN), a wireless local area network (WLAN), a municipal area network (MAN), a wide area network (WAN), or some combination thereof. The communication network 130 may feature direct or multi-node communication paths/channels that may operate utilizing any number of standards or protocols including TCP/IP, 802.11, Bluetooth, GSM, GPRS, 4G, and LTE. In some cases, the communication network 130 may include Internet connectivity. Communication network 130 may include a variety of connected computing devices that provide one or more elements of a network-based service. The communications network 130 may include actual server hardware or virtual hardware simulated by software running on one or more actual machines thereby allowing for software controlled scaling in a cloud environment.

The front-end devices 135 may be mobile devices, such as cellular phones (e.g., "smart" phones), portable media players, or portable video game consoles used by venue guests. Such front-end devices 135 may receive data identifying current or future wait time estimates corresponding to different attractions or points of interests, for example allowing a venue guest to decide an optimal time to visit a particular attraction or point of interest, or to have an estimate of how long the wait time at a particular point of interest will be once the guest reaches that point of interest after walking there or being transported there. An estimated wait time may be used by front-end devices 135 to provide further predictions based also on walking time to various points of interest (e.g., "head to this ride and get in line right away, it's going to be much busier soon!").

A Point-of-Entry/Exit POE device 115A, a POS device 115B, or an administrator console 145 may be a front-end device 135 in addition to being a data source 105. Thus, these devices may receive data from the application server(s) 125 identifying estimated wait times. For example, a staff member at a cash register (i.e., a POS device 115B) may receive an alert from the application server(s) 125 identifying that wait times are expected to drastically increase in the near future (e.g., because a nearby movie show just ended), and recommending that guest throughput (e.g., by opening another cash register) or guest capacity (e.g., by adding additional seats) be increased to alleviate potential issues before they actually occur. Thus, venues can prevent capacity and throughput problems proactively rather than reactively.

Front-end devices 135 are also inclusive of kiosks, staff mobile devices, staff wearable devices, venue devices, captive portals, and digital signs. Each of these devices may also be a data source 105 that provides information 140 not only about itself, but also about other devices that it interacts with. For example, a device operated by a staff member may report information 140 about a guest's mobile device 110 after an interaction between the two devices.

Figure 2:
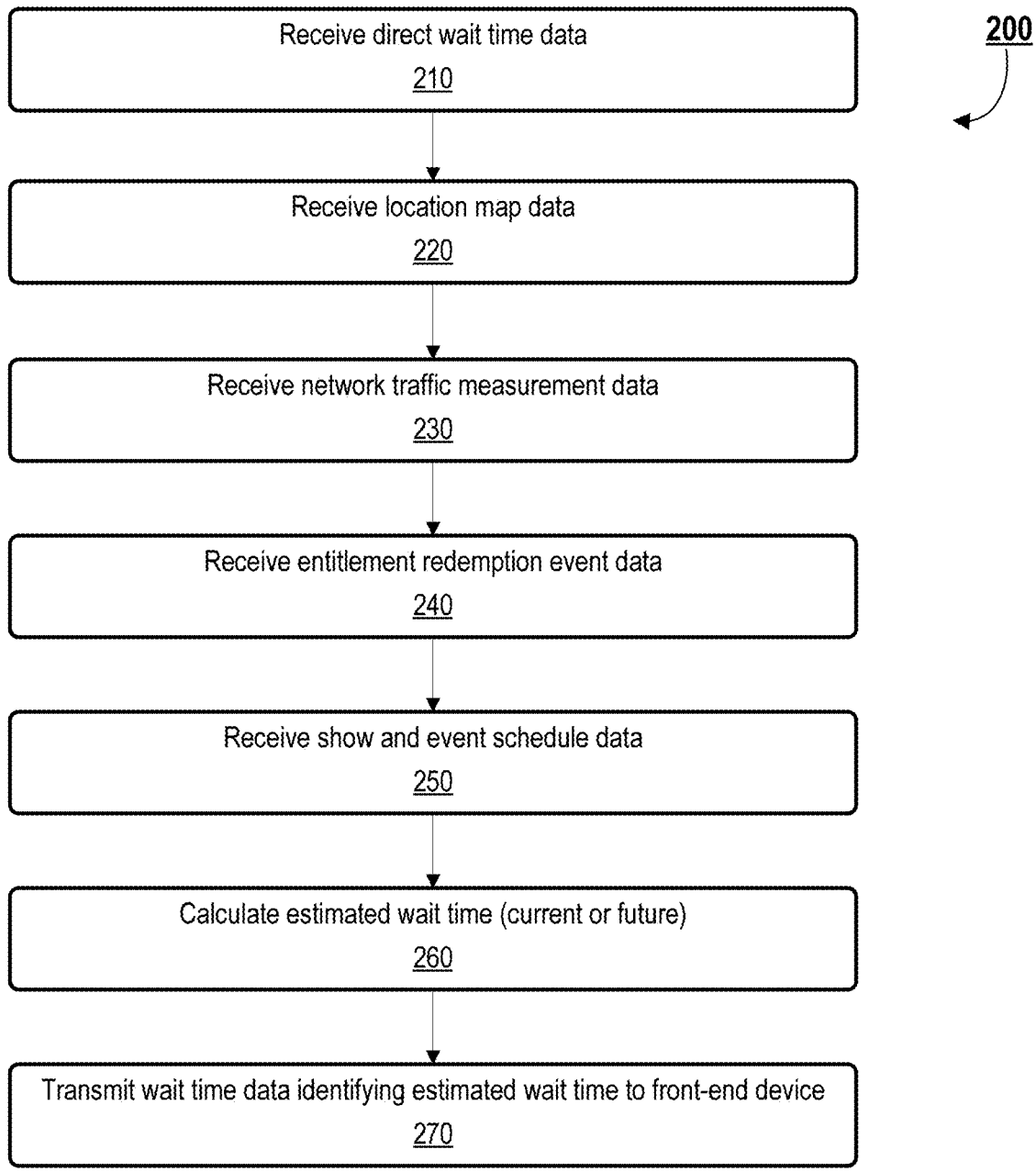
FIG. 2 is a flow diagram illustrating exemplary operations for calculating an estimated wait time.

FIG. 2 is a flow diagram illustrating exemplary operations 200 for calculating an estimated wait time. In particular, FIG. 2 outlines how the application server(s) 125 gather information 140 and use it to calculate an estimated wait time. It should be noted that the steps of FIG. 2 are exemplary and need not occur consecutively as illustrated in FIG. 2. Various steps illustrated in FIG. 2 and discussed below may occur consecutively, concurrently, or intermittently. For example, information from steps 210-250 may be received concurrently with respect to undertaking the calculation described with respect to step 260. Further, various steps may be occasionally, routinely, or temporarily omitted from the analysis process.

Information 140 can be collected by the application server(s) 125 through multiple methods. For example, information 140 may be collected through connected devices (guest mobile devices report detection of a POE beacon/terminal/geofence/waypoint 115A or vice versa). Information 140 may also be collected through sensors installed in the venue reporting a device location (connected iBeacons, Wi-Fi, RFID). Cameras installed in the venue identifying guests via facial recognition may also be information sources.

At step 210, a "direct" wait time may be measured and provided to the application server(s) 125 either automatically via location data (e.g., GPS location data from mobile devices 110 and/or POE locations beacons 115A). Measurement may also occur via visual tracking effectuated either manually by staff (e.g., entered via an administrator console 145 or POS terminal 115B) or automatically via cameras with facial recognition. The "direct" wait time may be a measurement based on tracking guests from a start of a line until entry into the point of interest (or in some cases until exit from the point of interest).

This information may be analyzed via comparison of timestamps collected when mobile devices 110 corresponding to particular guests are tracked at certain locations corresponding to a line and to an entry or exit. Examples include a movable POE terminal/beacon 115A at the beginning of the line, a POE terminal/beacon 115A at the entry to the point of interest, and a POE terminal/beacon 115A at the exit of the point of interest. The application server(s) 125 may receive the direct wait time data in the form of these timestamps.

At step 220, location map data is received at the application server(s) 125. Locations of venue guests may be tracked in real-time, periodically, or only at certain waypoints such as point-of-entry beacons 115A or point-of-sale terminals 115B. A location map can be generated from all of these disparate location points tracking all known guest locations for a given area. The area could be only an area relevant to one point of interest, such as a line area. The area can be expanded to include a predetermined radius around the point of interest or to include other neighboring points of interest, thus allowing the location map to detect and predict individual guest movements and larger guest group migration events, such as a large number of guests exiting a movie theatre or show at once when it finishes. The location map may be generated by inputting locations and corresponding times, dates, days of the week, months, years, self-reported wait times, and other information into a wait time calculation algorithm. The wait time calculation algorithm may be applied to ignore or minimize (negatively weight) points with missing data.

Information received and provided over communications network 130 may come from other information systems such as the global positioning system (GPS), cellular service providers, or third-party service providers such as social networks. The system 100 can measure location and proximity using hardware on a user device (e.g., GPS) or collect the data from fixed hardware and infrastructure such as Wi-Fi-based or cellular-tower-based positioning systems and Radio Frequency ID (RFID) readers. An exemplary location and proximity implementation may include a Bluetooth low-energy beacon with real-time proximity detection that can be correlated to latitude/longitude measurements for fixed beacon locations.

If a guest arrives at ride entry waypoint, then departs, then arrives and departs again during a configurable period (i.e. the length of the ride), only the first or last departure event might be tracked. This addresses the scenario where guests exit the ride at the same location that they board, so they'll be spotted twice: once before they ride and once after. Not all rides are configured this way, however, since with some rides, guests may disembark at an exit that is located in a different place than the entrance, and thus may be tracked separately.

At step 230, the application server(s) 125 receive network traffic measurement data. The network traffic includes network traffic of guests within the venue as determined by network connected sensors. For example, guests connecting to (or being detected by) Wi-Fi hotspots, Bluetooth beacons, or near-field-communication (NFC) devices such as radio-frequency identification (RFID) devices may provide another method of tracking locations of guests. Furthermore, if it is detected that guests are using their mobile devices 110 to search for information about a particular point of interest, a probability may be entreated into the wait time calculation algorithm later that that guest may be headed toward that particular point of interest.

At step 240, the application server(s) 125 receive entitlement redemption event data. This may include various promotions being offered by the venue, such as discounted tickets to the venue on certain days of the week/month/year. Entitlement redemption event data may also include promotions being offered by certain points of interest within the venue, such as discounts/offers at certain restaurants, free rides for certain theme park attractions. Entitlement redemption event data may also include promotions being used by guests, for example identifying that a certain promotion has turned out to be extremely popular or unpopular. Entitlement redemption event data may also include some combination of the above-recited categories of entitlement redemption event data. Promotions and entitlements can ultimately influence wait times by driving up probabilities that guests will be at the venue, or that guests will head to certain points of interest at the venue at certain times.

At step 250, the application server(s) 125 receive show and event schedule data. This allows the wait time calculation algorithm to predict when large crowds might exit a particular point of interest, such as a scheduled end of a movie or show, and head to other nearby points of interest, such as bathrooms, restaurants, or rides. Similarly, this allows the server 125 to predict when large crowds might enter a particular point of interest, such as a discounted time period or a grand opening of a new attraction at the venue.

At step 260, the application server(s) 125 calculate an estimated wait time using the wait time calculation algorithm. The wait time calculation algorithm may use probability calculations, particularly if it is a Bayesian algorithm, and may in particular factor in probabilities of various occurrences based on all of the real-time and historical data it receives (e.g., information 140 of FIG. 1 and/or steps 210-250 of FIG. 2). Based on this information, the wait time calculation algorithm may accurately predict current wait times and future wait times. The wait time calculation algorithm may be based on Bayesian algorithms, nearest-neighbor algorithms, alternating squares algorithms, or some combination thereof. In some embodiments, the wait time calculation algorithm may be replaced with or used in combination with artificial intelligence or machine learning techniques/systems, such as neural networks, and may self-train and self-correct by estimating future wait times, seeing how accurate its estimates turned out once that "future" time comes to pass, and adjusting its later-predicted wait time estimates accordingly.

This concept can be expanded in a number of different ways. For example, additional metadata may be added to the wait time calculation algorithm inputs such as time of day, day of week, season, show schedules, and the like for more accurate results. Guest travel time to get to a ride (e.g., the guest is 15 minutes away) may also be factored in such that the algorithm could be used for predicting what the wait time will be in 15 minutes. Instead of showing the current predicted wait-time, the results can be personalized to show the estimated wait time when the guest arrives (or allow the guest to see expected wait-times through the remainder of the day to better plan their trip). The same solution could be used not just to predict wait times at a point of interest, but generally for predicting heavy or light traffic anywhere within the venue. For instance, if show schedules are one of the inputs, the line length at the food court could vary significantly depending on whether there is a show which ends at 11:30, 12, or 12:30.

Other information could also be used to generate the estimated wait time, such as thermometer data, barometer data, hygrometer data, wind vane data, rain gauge data, light sensor data, weather forecast data, a national/local holiday calendar, a local school vacation calendar, a current tide level measurement (e.g., which may affect aquatic or beach-related venues), a tide forecast, power outage data, seismometer data, smoke detector data, air quality data, emergency detection data, emergency forecast data or some combination thereof. Emergency detection data may include sensor measurement data identifying forecasts earthquakes, tornadoes, fires, tsunamis, or other natural or man-made disasters. Emergency forecast data may include data suggesting that such emergencies are likely to happen. For example, if the venue is near a body of water, information identifying that an earthquake has occurred near the same body of water may suggest that a tsumani or aftershock earthquakes are both likely to affect the venue in the near future.

At step 270, the application server(s) 125 transmit data that includes estimated wait time(s) to one or more front-end devices. This data can take many forms so as to be compatible with different applications and user interfaces, such as the user interfaces illustrated in FIG. 3A, FIG. 3B, FIG. 3C, and FIG. 4. The report time may be reported to a mobile device 110 of a guest at the venue through an application installed on a device such as a mobile device 110. In some instances, wait times can also be displayed on signs at the line entrance to the point of interest, or on signage provided in the line or waiting area. Signage could be manually updated by staff or updated automatically on digital displays that are front-end devices 135.

Figure 3A:
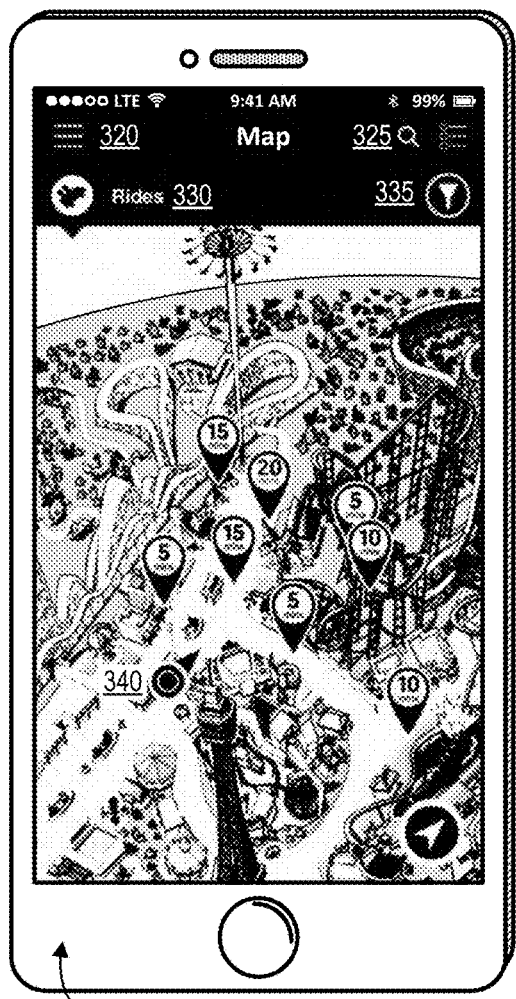
FIG. 3A illustrates a map user interface that identifies estimated wait times for multiple attractions on a distorted map of a venue.

FIG. 3A illustrates a map user interface that identifies estimated wait times for multiple attractions on a distorted map of a venue. The map user interface is illustrated in FIG. 3A being displayed via a display screen of a front-end device 305, which is illustrated as a mobile device 110.

The map user interface of FIG. 3A includes a distorted map 315 with a guest location marker 340 and a number of markers identifying estimated wait times for various points interest. For example, different points of interest marked on the map 315 are illustrated in FIG. 3A as having 5 minute wait times, 10 minute wait times, 15 minute wait times, or 20 minute wait times, depending on the lines outside each point of interest.

The map 315 of FIG. 3A is distorted in that it is not illustrated entirely to scale. In particular, certain areas may be illustrated at a closer scale (i.e., more "zoomed in") than other areas. For example, in the map 315 of FIG. 3A, an area including the guest location marker 340 and the point of interest location markers is illustrated at a closer "more zoomed in" scale (e.g., a 1:10 scale), while areas of the entertainment venue that are farther away from the guest location marker 340 and the point of interest location markers are illustrated at a farther "more zoomed out" scale (e.g., a 1:100 scale). Each "area" may be of uniform scale, or may have a gradual increase/decrease in scale internally, or some combination thereof.

An area including guest location marker 340 and point of interest location markers could gradually have a farther "more zoomed out" scale towards the edges of the area. The areas could be segmented internally as well. For example, a sub-area including the guest location marker 340 may be illustrated at a closer scale (e.g., a 1:5 scale) than an area including the point of interest location markers (e.g., a 1:15 scale), or vice versa. It should be noted that while FIG. 3B illustrates the map 335 as distorted, in some cases, it may instead be an ordinary map illustrated entirely at one scale.

The map user interface of FIG. 3A also includes an application navigation element 310. This identifies that the current user interface is the "map" user interface, includes a search function 320 allowing a user of the front-end device 305 to search through the map for a particular point of interest, includes a specifier 330 that identifies that the points of interest currently shown on the map are "rides" as opposed to restaurants or bathrooms, and includes a filter function 335 allowing a user of the front-end device 305 to further filter the types of points of interest shown (e.g., scary roller-coaster rides, child-friendly rides). The application navigation element 310 of FIG. 3A also includes a menu button 320 allowing further navigation within the application (e.g., to reach the list user interface illustrated in FIG. 3C).

Figure 3B:
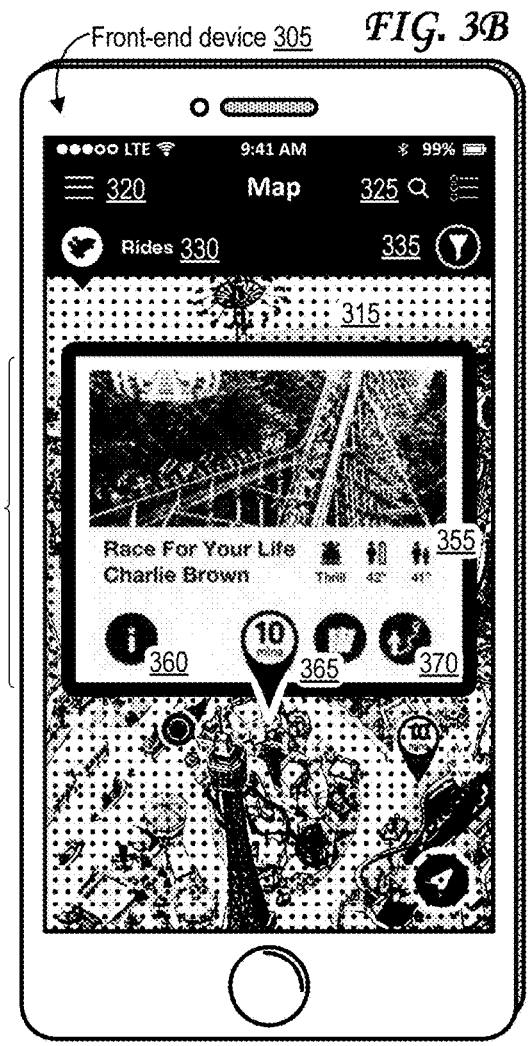
FIG. 3B illustrates a pop-up alert displayed over a map user interface, the pop-up alert identifying an estimated wait time and various facts about a particular attraction in a venue.

FIG. 3B illustrates a pop-up alert displayed over a map user interface, the pop-up alert identifying an estimated wait time and various facts about a particular attraction in a venue. The pop-up alert 350 and map-user interface are illustrated in FIG. 3B being displayed via a display screen of a front-end device 305, which is illustrated as a mobile device 110.

The pop-up alert 350 of FIG. 3B is overlaid over the map user interface 315 of FIG. 3B, which is darkened to put the emphasis on the pop-up alert 350. This darkened map user interface 315 of FIG. 3B may or may not retain ordinary map functionality or interactivity while the pop-up alert 350 remains displayed. For example, panning, zooming, or selecting different points of interest may be disabled while the pop-up alert 350 remains displayed. The pop-up alert 350 of FIG. 3B includes a point of interest name ("Race For Your Life Charlie Brown"), a photo of the point of interest, some details 355 (identifying the ride as a "thrill" ride, identifying a 42 inch height requirement, and identifying a under-41-inch guardian supervision requirement), and an estimated wait time (10 minutes). The pop-up alert 350 of FIG. 3B also includes navigation buttons, including an information button 360 that navigates the user to a point of interest information user interface (e.g., such as the one illustrated in FIG. 4), a ticket button 365 that navigates the user to an electronic copy of their tickets (e.g., and in some cases may alert the user to available promotions), and a travel map button 370 that navigates the user to a map with travel directions (e.g., walking directions, bus directions, trolley directions, driving directions, or some combination thereof) to the identified point of interest.

The map user interface in the background of FIG. 3B also includes the application navigation element 310 of FIG. 3A.

Figure 3C:
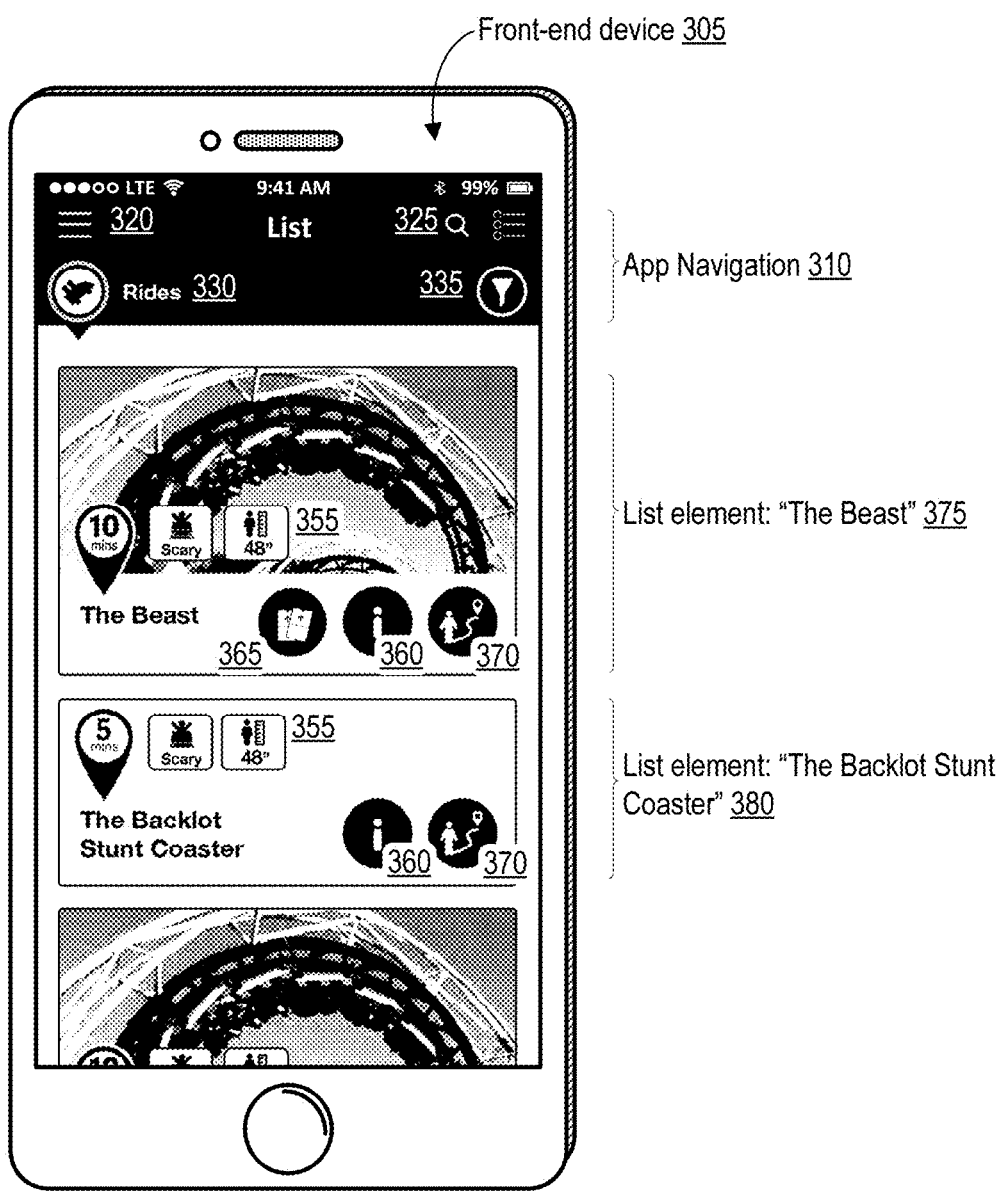
FIG. 3C illustrates a list user interface identifying estimated wait times and various facts about multiple attractions in a venue.

FIG. 3C illustrates a list user interface identifying estimated wait times and various facts about multiple attractions in a venue. The list user interface is illustrated in FIG. 3C being displayed via a display screen of a front-end device 305, which is illustrated as a mobile device 110.

The list user interface of FIG. 3C includes a list element 375 identifying one ride named "The Beast." The list element 375 identifies a 10 minute estimated wait time, and includes details 355 identifying "The Beast" ride as "scary" and as having a 48 inch height requirement. The list element 375 also includes a ticket button 360 and a travel button 370, as well as an information button 365 that navigates to the point of interest information user interface illustrated in FIG. 4.

The list user interface of FIG. 3C includes a list element 380 identifying one ride named "The Backlot Stunt Coaster." The list element 380 identifies a 10 minute estimated wait time, and includes details 355 identifying "The Backlot Stunt Coaster" ride as "scary" and as having a 48 inch height requirement. The list element 375 also includes a ticket button 360 and a travel button 370.

The list user interface of FIG. 3C also includes an application navigation element 310 similar to the application navigation element 310 illustrated in FIG. 3A, though the application navigation element 310 of FIG. 3C identifies that the current user interface is the "list" user interface, and the search function 325 and filter function 335 are applied to searching for points of interest within the list and filtering the points of interest viewable within the list, respectively. The menu 320 of FIG. 3C may be used to return to the map user interface of FIG. 3A.

Figure 4:
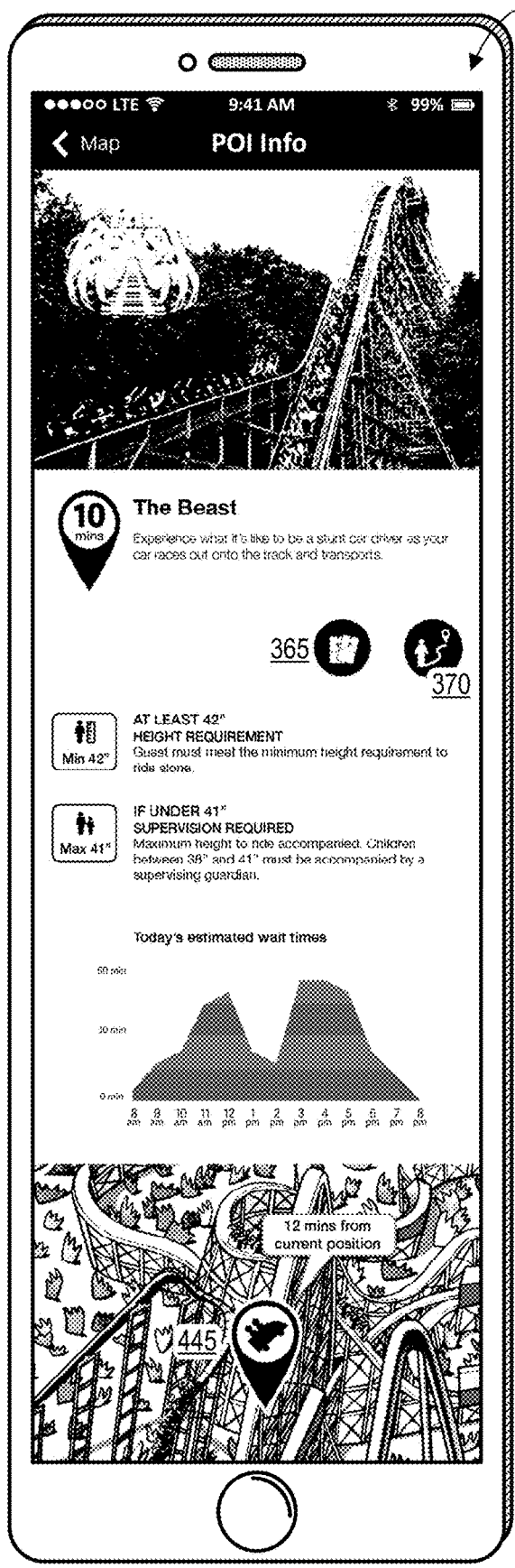
FIG. 4 illustrates a point of interest information user interface identifying an estimated wait time graph and other facts about a particular attraction in a venue.

FIG. 4 illustrates a point of interest information user interface identifying an estimated wait time graph and other facts about a particular attraction in a venue. The point of interest information user interface is illustrated in FIG. 4 being displayed via a display screen of a front-end device 305, which is illustrated as a mobile device 110. While front-end device 405 of FIG. 4 is illustrated in an exaggerated manner with a vertically lengthy display, it should be understood that the proportions of the front-end device 405 could be closer to those of exemplary front-end device 305, and that the notification user interface of FIG. 4 could include a scroll bar or other scrolling mechanism to scroll through the notification user interface of FIG. 4, for example via touchscreen gestures, mouse movements, mouse clicks, scroll wheel/ball movements, or some combination thereof.

The point of interest information user interface of FIG. 4 includes an application navigation element 410 that identifies that the current user interface is a point of interest information user interface ("POI Info") and allows the user to navigate back to a map user interface, such as the map user interface of FIG. 3A. In another embodiment, the application navigation element 410 of FIG. 4 could instead allow the user to navigate back to a list user interface, such as the list user interface of FIG. 3C.

The point of interest information user interface of FIG. 4 also includes an image 415 of the point of interest, which in this case is the ride "The Beast," as explained in the name segment 420, which also identifies the wait time (10 minutes) and a summary of the ride ("Experience what it's like to be a stunt car driver as your car races out onto the track and transports.") The point of interest information user interface of FIG. 4 also includes a buttons section 425 with a ticket button 365 and a travel button 370. The point of interest information user interface of FIG. 4 also includes a height requirement information section 430 identifying a 42 inch height requirement and identifying a guardian supervision requirement for guests from 38 inches to 41 inches in height.

The point of interest information user interface of FIG. 4 also includes an estimated wait time graph 435. This is generated by the application server(s) 125 using the wait time calculation algorithm as described in reference to FIG. 2, and includes future wait times so that the guest in question can plan when they wish to get on the "Beast" ride. For example, 1 pm-2 pm is predicted to have low wait times, but 3 pm-5 pm is predicted to have high wait times, so a guest might use this to plan to ride the "Beast" ride around 1:30 pm. Similarly, venue staff might use this type of estimated wait time graph 435 to plan an appropriate reaction to alleviate potential problems before they become real problems. For example, venue staff may act to increase guest throughput by increasing the number of staff or cashiers. Venue staff might also act to increase capacity by increasing a number of seats for a show or increasing a number ride cars operating on a theme park ride. Such venue staff actions may be planned ahead of time during estimated peak times, such as 3 pm-5 pm as identified in FIG. 4.

The point of interest information user interface of FIG. 4 also includes a mini-map 440 that identifies a location 445 of the "Beast" ride within a map showing a portion of the venue. The mini-map 440 may be distorted as discussed regarding the map 315 of FIG. 3A, or may be an ordinary map drawn to scale.

Figure 5:
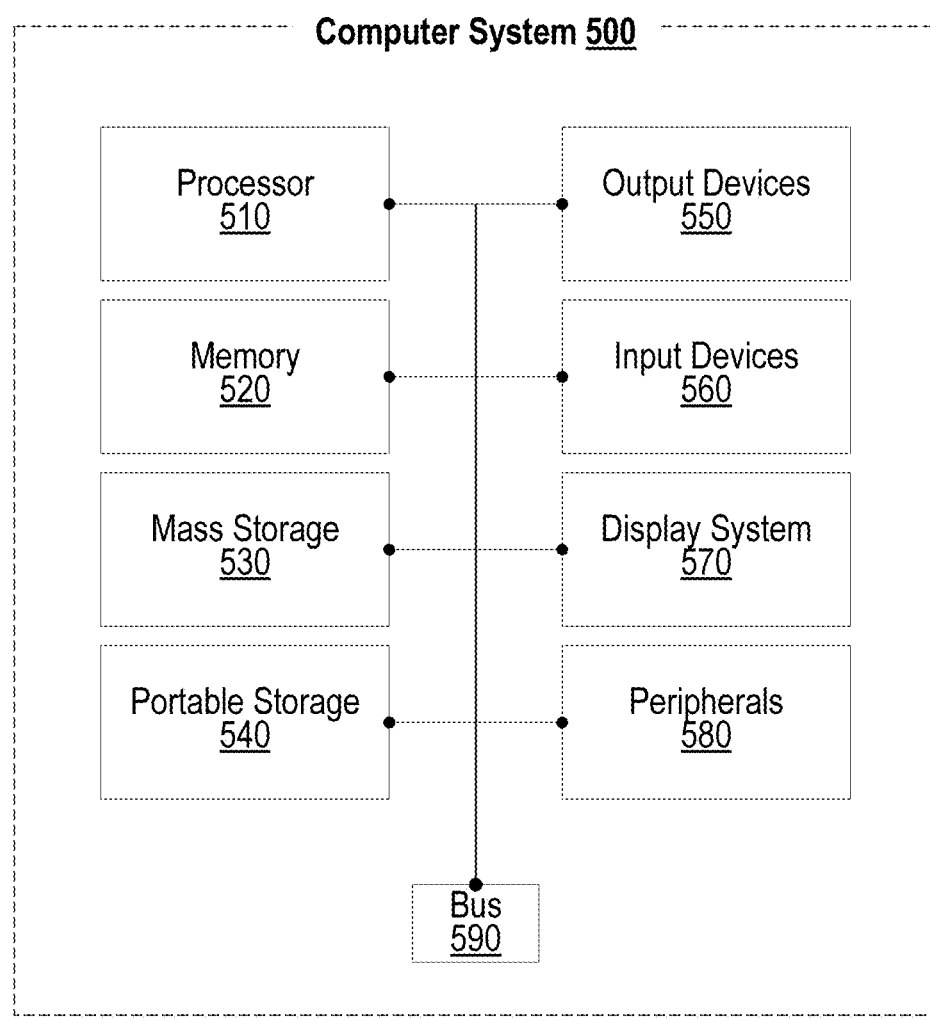
FIG. 5 is a block diagram of an exemplary computing device that may be used to implement an embodiment of the present invention.

FIG. 5 illustrates an exemplary computing system 500 that may be used to implement an embodiment of the present invention. For example, any of the computer systems or computerized devices described herein may, in at least some cases, be a computing system 500. The computing system 500 of FIG. 5 includes one or more processors 510 and memory 510. Main memory 510 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 510 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 510.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD), a plasma display, an organic light-emitting diode (OLED) display, an electronic ink display, a projector-based display, a holographic display, or another suitable display device. Display system 570 receives textual and graphical information, and processes the information for output to the display device. The display system 570 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 500 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 500 may be part of a multi-computer system that uses multiple computer systems 500, each for one or more specific tasks or purposes. For example, the multi-computer system may include multiple computer systems 500 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 500 from different networks communicatively coupled together via the internet (also known as a "distributed" system).

While various flow diagrams provided and described above may show a particular order of operations performed by certain embodiments of the invention, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for estimating queue wait time, comprising:
measuring, by a server, a direct wait time of at least one venue guest, of a plurality of venue guests near a point of interest located in a venue, by:
receiving, from one or more cameras present in the venue, one or more timestamped images of the venue and performing facial recognition on the timestamped images; or
receiving, from one or more beacons present in the venue, one or more timestamps tracking one or more of a plurality of mobile devices, corresponding to the plurality of venue guests, in proximity to the one or more beacons;
tracking, by the server and via a global positioning system (GPS), locations of the plurality of mobile devices;
receiving, by the server, event schedule data corresponding to schedules associated with the point of interest, the event schedule data identifying a plurality of scheduled times corresponding to a plurality of events occurring at the point of interest and/or nearby points of interest;
identifying, by the server, one or more trends based on the event schedule data;
generating, by the server, a first estimated wait time associated with a first period of time and a second estimated wait time associated with a second period of time by inputting, into a Bayesian algorithm based machine learning model, the measured direct wait time, the tracked locations of the plurality of mobile devices, the plurality of scheduled times in the received event schedule data, or the one or more trends; and
triggering, by the server and via a map user interface of a front-end device, display of the first estimated wait time or the second estimated wait time.

2. The method of claim 1, wherein the second estimated wait time is longer than the first estimated wait time, and wherein triggering display comprises triggering display of the first time period based on a difference between the first estimated wait time and the second estimated wait time.

3. The method of claim 1, wherein the second estimated wait time is longer than the first estimated wait time, and wherein triggering display further comprises identifying that the point of interest is associated with at least one of a low venue guest throughput or a low venue guest capacity.

4. The method of claim 1, further comprising measuring network traffic of at least one of the plurality of mobile devices, and wherein generating the first estimated wait time is further based on the measured network traffic.

5. The method of claim 1, further comprising receiving entitlement redemption data identifying redemption of an entitlement by one of the plurality of mobile devices, and wherein generating the first estimated wait time is further based on the received entitlement redemption data.

6. The method of claim 1, further comprising receiving weather data identifying weather that affects at least a subset of the venue, and wherein generating the first estimated wait time is further based on the received weather data.

7. The method of claim 1, further comprising generating a plurality of additional estimated wait times at predetermined intervals from each other, and triggering display of the plurality of additional estimated wait times.

8. The method of claim 7, further comprising generating a graph charting the first estimated wait time and the plurality of additional estimated wait times, and triggering display of the graph.

9. The method of claim 1, wherein the front-end device is a mobile device corresponding to a venue guest of the plurality of venue guests.

10. The method of claim 1, wherein the front-end device is a staff device corresponding to a venue staff member.

11. The method of claim 1, wherein triggering display further comprises generating the map user interface that identifies the first estimated wait time at a location on a map corresponding to a location of the point of interest, and displaying the first estimated wait time at the front-end device via the map user interface.

12. The method of claim 11, wherein the map is distorted so that a first region is drawn at a first scale and a second region is drawn at a second scale.

13. The method of claim 12, wherein the map includes a third region between the first region and the second region, the third region having a gradual increase or decrease in scale between the first scale and the second scale.

14. The method of claim 1, wherein the first estimated wait time indicates a prediction for how long one of the plurality of venue guests would take to traverse a queue corresponding to the point of interest during the first period of time.

15. The method of claim 1, wherein the second estimated wait time predicts how long one of the plurality of venue guests would take to traverse a queue corresponding to the point of interest at a predetermined future time.

16. A system for estimating queue wait time, the system comprising:
 a communication transceiver of a server, the communication transceiver configured to:
  measure a direct wait time of at least one venue guest, of a plurality of venue guests near a point of interest located in a venue, by:
   receiving, from one or more cameras present in the venue, one or more timestamped images of the venue and performing facial recognition on the timestamped images; or
   receiving, from one or more beacons present in the venue, one or more timestamps tracking one or more of a plurality of mobile devices, corresponding to the plurality of venue guests, in proximity to the one or more beacons;
  track, via a global positioning system (GPS), locations of a plurality of mobile devices; and
  receive event schedule data corresponding to schedules associated with the point of interest, the event schedule data identifying a plurality of scheduled times corresponding to a plurality of events occurring at the point of interest and/or nearby points of interest;
 a memory of the server; and
 a processor of the server coupled to the memory and to the communication transceiver, wherein execution of instructions stored in the memory by the processor cause the processor to:
  identify one or more trends based on the event schedule data;
  generate a first estimated wait time associated with a first period of time and a second estimated wait time associated with a second period of time by inputting, into a Bayesian algorithm based machine learning model, one or more of the measured direct wait time, the tracked locations of the plurality of mobile devices, the plurality of scheduled times in the received event schedule data, or the one or more trends; and
  trigger, via a map user interface of a front-end device, display of the first estimated wait time or the second estimated wait time.

17. The system of claim 16, wherein the communication transceiver is further configured to measure network traffic of at least one of the plurality of mobile devices, and wherein generating the first estimated wait time is further based on the measured network traffic.

18. The system of claim 16, wherein the communication transceiver is further configured to receive entitlement redemption data identifying redemption of an entitlement by one of the plurality of mobile devices, and wherein generating the first estimated wait time is further based on the received entitlement redemption data.

19. A non-transitory computer-readable storage medium, having embodied thereon a program executable by a processor to cause:
 measuring a direct wait time of at least one venue guest, of a plurality of venue guests near a point of interest located in a venue, by:
  receiving, from one or more cameras present in the venue, one or more timestamped images of the venue and performing facial recognition on the timestamped images; or
  receiving, from one or more beacons present in the venue, one or more timestamps tracking one or more of a plurality of mobile devices, corresponding to the plurality of venue guests, in proximity to the one or more beacons;
 tracking locations of a plurality of mobile devices corresponding to the plurality of venue guests;
 receiving event schedule data corresponding to schedules associated with the point of interest, the event schedule data identifying a plurality of scheduled times corresponding to a plurality of events occurring at the point of interest and/or nearby points of interest;
 identifying: one or more trends based on the event schedule data;
 generating a first estimated wait time associated with a first period of time and a second estimated wait time associated with a second period of time by inputting, into a Bayesian algorithm based machine learning mode, one or more of the measured direct wait time, the tracked locations of the plurality of mobile devices, the plurality of scheduled times in the received event schedule data, and the one or more trends; and
 triggering, via a map user interface of a front-end device, display of the first estimated wait time or the second estimated wait time.

20. A method for estimating queue wait time, comprising:
 measuring, by a server, a direct wait time of at least one venue guest, of a plurality of venue guests near a point of interest located in a venue, by:
  receiving, from one or more cameras present in the venue, one or more timestamped images of the venue and performing facial recognition on the timestamped images; or
  receiving, from one or more beacons present in the venue, one or more timestamps tracking one or more of a plurality of mobile devices, corresponding to the plurality of venue guests, in proximity to the one or more beacons;
 tracking, by the server and via a global positioning system (GPS), locations of a plurality of mobile devices corresponding to the plurality of venue guests;
 receiving, by the server, event schedule data corresponding to a schedule identifying an event time at which an event is scheduled to be held at the point of interest and/or nearby points of interest;
 receiving, by the server, weather data;
 generating a first estimated wait time associated with a first period of time and a second estimated wait time associated with a second period of time by inputting, into a Bayesian algorithm machine learning model, one or more of the measured direct wait time, the tracked locations of the plurality of mobile devices; and
 triggering, via a map user interface of a front-end device, display of the first estimated wait time or the second estimated wait time.

21. A system for estimating queue wait time, the system comprising:
 a communication transceiver of a server, the communication transceiver configured to:
  measure a direct wait time of at least one venue guest, of a plurality of venue guests near a point of interest located in a venue, by:
   receiving, from one or more cameras present in the venue, one or more timestamped images of the venue and performing facial recognition on the captured timestamped images; or
   receiving, from one or more beacons present in the venue, one or more timestamps tracking one or more of a plurality of mobile devices, corresponding to the plurality of venue guests, in proximity to the one or more beacons;
track, via a global positioning system (GPS), locations of the plurality of mobile devices;
receive event schedule data corresponding to a schedule identifying an event time at which an event is scheduled to be held at the point of interest and/or nearby points of interest; and
receive weather data;
a memory of the server; and
a processor of the server coupled to the memory and to the communication transceiver, wherein execution of instructions stored in the memory by the processor cause the processor to:
generate a first estimated wait time associated with a first period of time and a second estimated wait time associated with a second period of time by inputting, into a Bayesian algorithm based machine learning model, the measured direct wait time, the tracked locations of the plurality of mobile devices, the received event schedule data and the received weather data;
triggering, via a map user interface of a front-end device, display of the first estimated wait time or the second estimated wait time.

22. A method for estimating queue wait time, the method comprising:
measuring, by a server, a direct wait time of at least one venue guest, of a plurality of venue guests near a point of interest located in a venue, by:
receiving, from one or more cameras present in the venue, one or more timestamped images of the venue and performing facial recognition on the timestamped images; or
receiving, from one or more beacons present in the venue, one or more timestamps tracking one or more of a plurality of mobile devices, corresponding to the plurality of venue guests, in proximity to the one or more beacons;
tracking, by the server and via a global positioning system (GPS), locations of the plurality of mobile devices;
receiving, by the server, event schedule data corresponding to a schedule identifying an event time at which an event is scheduled to be held at the point of interest;
receiving, by the server, weather data;
generating, by the server, one or more probabilities based on the measured direct wait time, the tracked locations of the plurality of mobile devices, the received event schedule data, and the received weather data, wherein each probability of the one or more probabilities identifies whether one or more of the plurality of venue guests will be in a queue corresponding to the point of interest and/or nearby points of interest; and
generate, by using a Bayesian algorithm and based the one or more probabilities, a first estimated wait time predicting how long one of the plurality of venue guests would take to traverse the queue at a first time; and
triggering, via a map use interface of a front-end device, display of the first estimated wait time.

* * * * *